US007998245B2

(12) United States Patent
Demonie et al.

(10) Patent No.: US 7,998,245 B2
(45) Date of Patent: Aug. 16, 2011

(54) CLEANING OF AN AIR FILTER SCREEN OF AN AGRICULTURAL VEHICLE

(75) Inventors: Lode A. Demonie, Staden (BE); Yvan C. C. Vandergucht, Reninge (BE)

(73) Assignee: CNH America LLC, New Holland, PA (US)

(*) Notice: Subject to any disclaimer, the term of this patent is extended or adjusted under 35 U.S.C. 154(b) by 39 days.

(21) Appl. No.: 12/460,299

(22) Filed: Jul. 16, 2009

(65) Prior Publication Data

US 2011/0011259 A1    Jan. 20, 2011

(30) Foreign Application Priority Data

Jul. 16, 2009  (GB) .................................. 0812966.0

(51) Int. Cl.
*B01D 46/04* (2006.01)
(52) U.S. Cl. .................. 95/20; 55/294; 55/296; 55/302; 55/283; 95/24; 460/97; 460/98; 460/102; 96/425
(58) Field of Classification Search .................... 55/268, 55/272, 288, 294, 299, 302, 385, 284, 285, 55/290, 295, 296, 297, 300, 283; 95/280, 95/24, 20; 460/97, 98, 99, 100, 101, 102
See application file for complete search history.

(56) References Cited

U.S. PATENT DOCUMENTS

| | | | | |
|---|---|---|---|---|
| 3,499,267 A | * | 3/1970 | Sloan et al. ....................... 55/290 |
| 3,667,195 A | * | 6/1972 | Angilly et al. .................. 96/425 |
| 3,837,149 A | * | 9/1974 | West et al. ..................... 55/282.5 |
| 4,222,754 A | * | 9/1980 | Horvat .............................. 55/283 |
| 4,233,040 A | * | 11/1980 | Vogelaar et al. ............. 55/282.5 |
| 4,296,780 A | * | 10/1981 | Norbach ......................... 138/40 |
| 4,377,401 A | * | 3/1983 | Laughlin ......................... 55/290 |
| 4,382,857 A | * | 5/1983 | Laughlin ......................... 209/23 |
| 4,439,218 A | * | 3/1984 | Priepke et al. .................. 55/288 |
| 4,443,236 A | * | 4/1984 | Peiler ........................... 55/282.5 |
| 4,461,623 A | * | 7/1984 | Casperson ..................... 23/314 |
| 4,542,785 A | * | 9/1985 | Bagnall et al. .................. 165/95 |
| 4,654,059 A | * | 3/1987 | Matyas ........................... 55/283 |
| 4,700,497 A | * | 10/1987 | Sato et al. ....................... 40/531 |
| 4,810,270 A | * | 3/1989 | Terry et al. ..................... 55/294 |
| 4,868,948 A | * | 9/1989 | Arnold ......................... 15/340.1 |
| 4,874,411 A | * | 10/1989 | Snauwaert et al. ............. 55/290 |
| 4,906,262 A | * | 3/1990 | Nelson et al. .................. 55/290 |
| 4,971,026 A | * | 11/1990 | Fineblum .................. 126/110 R |
| 5,006,136 A | * | 4/1991 | Wetter ............................ 55/290 |
| 5,183,487 A | * | 2/1993 | Lodico et al. .................. 55/289 |
| 5,205,847 A | * | 4/1993 | Montieth et al. ................ 55/294 |

(Continued)

FOREIGN PATENT DOCUMENTS

CA          2257332          6/2000

*Primary Examiner* — Duane Smith
*Assistant Examiner* — Thomas McKenzie
(74) *Attorney, Agent, or Firm* — Michael G. Harms; Patrick M. Sheldrake

(57) ABSTRACT

A method and apparatus are disclosed for unblocking a perforated rotary filter screen. In the invention, at least one jet of high pressure air is directed at a surface of the filter screen as the filter screen is rotated and the or each jet of air is moved in a direction transverse to the direction of movement of the perforations in the screen in order to cause the or each air jet to trace a spiral or helical path over the surface of the screen.

19 Claims, 1 Drawing Sheet

U.S. PATENT DOCUMENTS

| | | | | |
|---|---|---|---|---|
| 5,565,012 A | * | 10/1996 | Buodd | 55/294 |
| 5,595,537 A | * | 1/1997 | Jungemann et al. | 460/100 |
| 5,676,197 A | * | 10/1997 | Diebold et al. | 165/41 |
| 5,735,337 A | * | 4/1998 | Edwards | 165/41 |
| 5,944,603 A | * | 8/1999 | Guinn et al. | 460/100 |
| 6,029,430 A | * | 2/2000 | Isfort et al. | 56/12.8 |
| 6,248,145 B1 | * | 6/2001 | Radke | 55/295 |
| 6,974,487 B2 | * | 12/2005 | Twiefel | 55/289 |
| 7,875,093 B1 | * | 1/2011 | Hershbarger et al. | 55/344 |
| 2002/0088208 A1 | * | 7/2002 | Lukac et al. | 55/289 |

* cited by examiner

CLEANING OF AN AIR FILTER SCREEN OF AN AGRICULTURAL VEHICLE

CROSS REFERENCE TO RELATED APPLICATIONS

This patent application claims priority under 35 U.S.C. §119 to GB 08.12.966.0, filed on Jul. 16, 2008 titled, "Cleaning of an Air Filter Screen of an Agricultural Vehicle" and having Lode A. Demonie and Yvan C. C. Vandergucht as inventors. The full disclosure of GB 08.12.966.0 is hereby fully incorporated herein by reference.

FIELD OF THE INVENTION

The present invention relates to the cleaning of an air intake filter screen of an agricultural machine, such as a harvester.

BACKGROUND OF THE INVENTION

Because of the dusty environment in which machines such as harvesters operate, it is important to filter the air passing through the radiator of the engine cooling system and any heat exchanger of an air conditioning or hydraulic system. As the filter itself can become blocked, it is common to pass the cooling air through a self-cleaning rotary filter screen. Such screens are known which rely on two mechanisms in order to remain clean. First, the rotation of the screen dislodges filtered particles. Second, a plenum chamber under low pressure is provided at a point around the circumference of the screen which acts as a vacuum cleaner to suck dust off the screen as it rotates.

Despite these measures, some crops generate a sticky mist during harvesting which causes the rotary screen to clog. On occasions the clogging is so severe that no air can pass through the filter screen, which then results in overheating of the engine. This necessitates cleaning of the rotary screen by the machine operator and such cleaning may be needed several times a day. However, the equipment needed for cleaning the rotary filter screen, such as a hard brush, a power washer and/or an air compressor, may not always be available to the machine operator. Furthermore, the prevailing conditions, such as low light or poor weather, may hinder the operator from performing the task of unclogging the rotary screen filter. Even under good conditions, an operator will not wish to leave a comfortable cab to undertake such a dirty and unpleasant task.

A rotary screen consisting of a perforated cylindrical drum can be cleaned using a cylindrical brush which is placed within the filter screen and is moved radially by an actuator such as a solenoid to engage in the perforations. Such systems have been in use for several years on combine harvesters manufactured by the present Applicants intended for harvesting corn.

Rotary filter screens which employ a perforated disc in place of a drum run at higher speeds (typically 150 to 300 rpm) and cannot be cleaned easily with brushes because the speed gradient from the centre towards the outside diameter causes irregular wear of the rotary brush. A rotary brush can be made in different sections rotating at different speeds to reduce the slippage but this in itself creates other problems. Furthermore, there is often insufficient space to accommodate such a row of brushes and their actuation system on the inside of the screen.

OBJECT OF THE INVENTION

The present invention seeks therefore to provide a method and apparatus for unclogging a rotary filter screen of an agricultural vehicle that does not require operator intervention and can reliably dislodge debris blocking the perforations of the filter screen.

SUMMARY OF THE INVENTION

According to a first aspect of the invention, there is provided a method of unblocking a perforated rotary filter screen which comprises directing at least one jet of high pressure air at a surface of the filter screen as the filter screen is rotated and moving the or each jet of air in a direction transverse to the direction of movement of the perforations in the screen in order to cause the or each air jet to trace a spiral or helical path over the surface of the screen.

Agricultural machines are increasingly being equipped with an engine driven air compressor which can provide a supply of air at a pressure sufficiently high (typically around 8 bar) to unclog a filter, even when blocked by a sticky deposit. To have sufficient energy to unblock a filter screen, a jet under this pressure needs to be concentrated so as to impact only a small area and for this reason using stationary jets would not allow a complete screen to be cleaned but only the narrow annular bands exposed to the jets as the filter screen rotates. Widening the jets to make the bands overlap would weaken the jets and render them ineffective at unblocking the filter screen.

It has indeed already been proposed, for example in DE 2841052, to blow air through a filter screen in order to clean it. However, because this proposal does not use high pressure air and because it uses a single stationary wide nozzle to cover the entire screen, the flow of air that it produces would not be capable unblocking a clogged filter screen and it can at best only be used in place of the conventional plenum chamber described above.

In the present invention, this problem is avoided by using narrow concentrated jets of air but moving them as the screen rotates in a direction transverse to the movement of the perforations. Thus when cleaning a disc, the jets are moved radially and the point of impact of each jet describes a spiral that scans the entire surface of an annular band. The radial displacement of each jet is at least equal to the separation of the jets so that the bands scanned by the different jets radially overlap one another. In a similar manner, when cleaning a perforated cylindrical drum, the jets are moved axially, this time describing a helix that scans a ring on the drum and the rings of different jets axially overlap so that the entire surface of the drum is cleaned.

Though the air jets could be directed at the rotary screen from either the upstream or the downstream side, it is preferred to direct the jets onto the upstream side of the filter screen. A first reason for doing is that there is more space available to place the jets on the upstream side of the filter screen. A second and possibly more important reason is that it results in better cleaning of the filter screen. The debris does not just block the perforations but forms a layer covering the entire screen. Some of the air aimed at the upstream side of the filter screen will pass through the perforations in order to unblock them but most of the air will be deflected to flow turbulently over the entire surface of the filter screen and dislodge all of the debris adhering to it. In this respect, the debris tends to become matted and to form a cohesive layer. The air jets act to peel pieces of this layer away from the surface of the filter screen instead of merely punching holes through it where the surface is perforated.

Unblocking of the filter screen by the use of air jets is not needed all the time and it is not intended as a replacement of any cleaning mechanism that constantly cleans the surface of the filter screen as it rotates. Instead, the filter screen is cleaned conventionally and the air jets are only brought into operation when conventionally operator intervention would be needed. An unblocking cycle can be commenced either by operator command or when blockage is detected by a suitable sensor, such as a pressure sensor, an air flow meter or an engine coolant temperature sensor. Advantageously, unblocking can be started when the operator commands an unloading of the grain tank.

In accordance with a second aspect of the invention, there is provided apparatus for unblocking a perforated rotary filter screen of an agricultural machine which comprises a tube connectable to a source of air under pressure and having at least one air nozzle for directing a jet of high pressure air towards a surface of the filter screen as the filter screen is rotated and means for reciprocating the tube in a direction transverse to the direction of movement of the perforations, to cause the jet to trace a spiral or helical path over the surface of the filter screen.

The tube is preferably mounted on the upstream side of a housing supporting the filter screen with each air jet facing towards the upstream side of the filter screen.

If the filter screen is shaped as a drum having both a perforated axial end face and a perforated cylindrical side wall, the unblocking apparatus may comprise two separate tubes, a first reciprocable axially to unblock the cylindrical side wall of the drum and a second reciprocable radially to unblock the axial end face of the drum.

Advantageously in such a construction a single linear actuator may be provided to cause both tubes to reciprocate, the actuator being rigidly connected to the first tube and being connected by a crank to the second tube.

The crank may suitably comprise an L-shaped bell crank lever of which one of the limbs is connected to the linear actuator and the other limb is connected to the second tube.

BRIEF DESCRIPTION OF THE DRAWINGS

The invention will now be described further, by way of example, with reference to the accompanying drawings, in which.

DETAILED DESCRIPTION OF THE PREFERRED EMBODIMENT(S)

Figure 1:
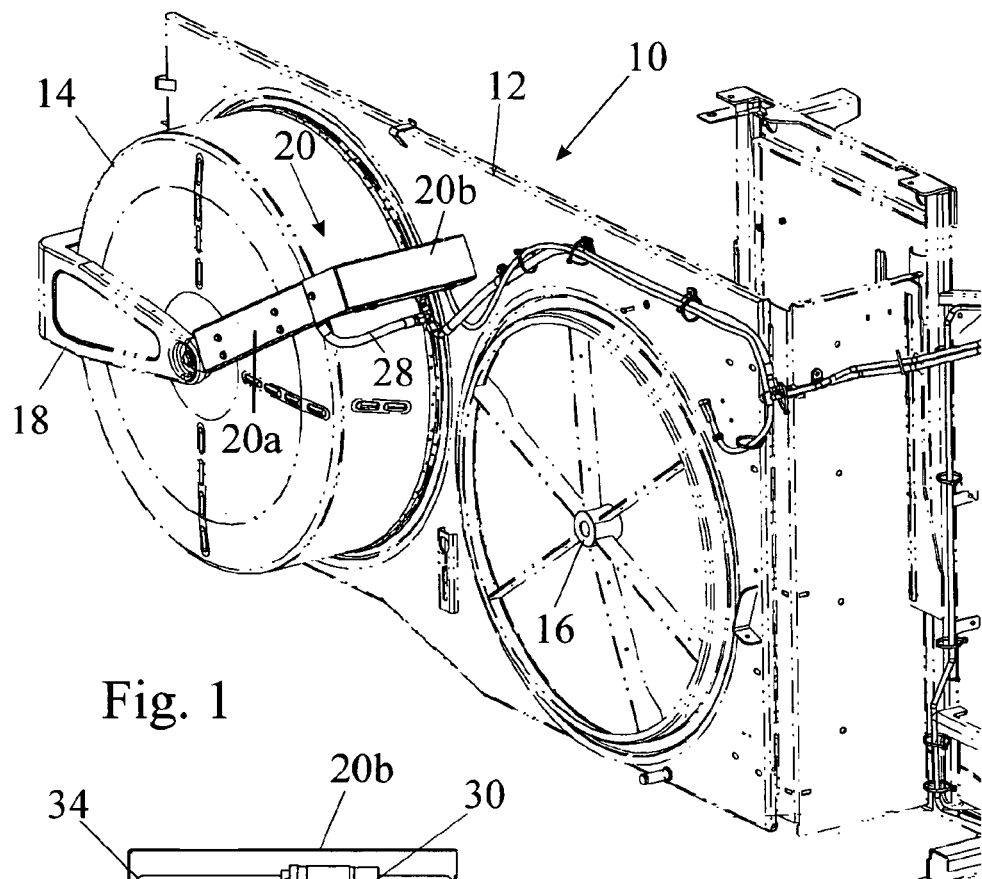
FIG. 1 is a perspective view of a duplex filter screen assembly from which one of the two filter screens has been removed.

FIG. 1 shows a duplex filter screen assembly 10 for filtering air blown by cooling fans onto the engine radiator of a combine harvester and optionally onto other heat exchangers that may be used in an air conditioning system or a hydraulic system of the harvester.

The assembly comprises a housing 12 on which two drum-shaped perforated filter screens 14 are supported. One of the screens has been omitted from the drawing to show the bearing 16 within which the axle of the filter screen 14 is journalled.

A radial plenum chamber 18 is mounted on the housing 12 on the upstream side of the filter screen 14. As dirty air is blown through the perforated filter screen 14, debris collects on its surface and risks blocking the perforations. Some of the debris is dislodged by the centrifugal action of the rotating screen 14 and the bulk of the remainder is sucked off the surface of the screen 14 as it passes under the radial plenum chamber 18, which acts as vacuum cleaner. A full plate sector is provided on the inside of the screen, opposite the chamber 18 for preventing filtered air from being drawn out again and improving cleaning performance by shutting off the under-pressure inside the housing 12.

As so far described, the filter screen assembly 10 is conventional and for this reason it is believed necessary to describe it in greater detail. The problem that such a filter screen assembly encounters is that not all the debris is sucked off the surface of the screen 14, especially when the crop is one, such as corn, that generates a sticky mist. Under such conditions, a residue builds up on the screen and the point can be reached where it completely blocks the perforations and prevent any air flow through the filter screen.

Figure 2:
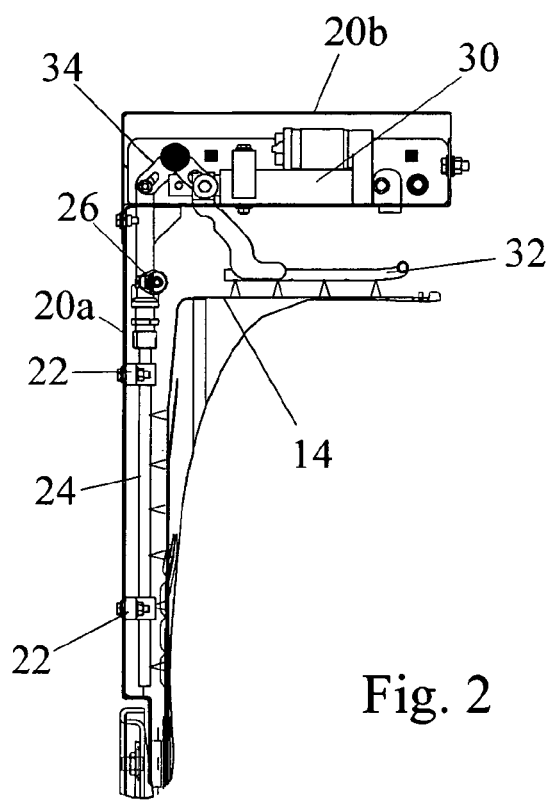
FIG. 2 is a section through a radial support arm of the assembly shown in FIG. 1, housing an unblocking apparatus of the invention.

This problem is overcome in the present invention by an unblocking apparatus that is mounted within a radial support arm 20 which is shown in more detail in the section of FIG. 2.

The support arm 20 has a radial section 20a which extends from the centre of the filter screen 14 to its circumference and an axial section 20b that runs parallel to the side wall of the filter screen 14. The radial section 20a has two bearing blocks 22 that support and guide a tube 24 for radial movement relative to the filter screen 14, the tube 24 being held at a distance of about 10 mm from the screen. The tube 24 has a coupling 26 for connection to a high pressure flexible hose 28 (see FIG. 1) that leads to a valve connected to a compressed air reservoir. The end of the tube 24 opposite the coupling 26 is closed, e.g. by welding. Along its length, the tube 24 is formed a series of holes of 1.5 mm diameter spaced from one another about 50 mm along the length of the tube. When compressed air is fed to the tube 24 the holes act as nozzles and direct jets or air towards the upstream surface of the filter screen 14. The bearing blocks 22 have a vertical slit on the side facing the screen 14, so as to allow continuous operation the air jets when the holes arrive at the height of one of these blocks.

A linear actuator 30 is housed within the axial section 20b of the support arm 20. The actuator, which may be electrical, pneumatic or hydraulic has an output shaft that reciprocates linearly when the cleaning apparatus is in use. The output shaft carries a second tube 32 which is constructed in a similar manner to the tube 24. The tube 32 extends parallel to the surface of the cylindrical side wall of the filter screen 14 and once again at a distance of about 10 mm from it.

In addition to carrying the tube 32, the output shaft of the actuator 30 is connected to one arm of a bell crank lever 34 which is pivoted to the support arm 20 at its midpoint and of which the other arm is pivotably connected to the tube 24.

When the filter screen is to be unblocked, compressed air is fed to the tube 24 and 32 and the linear actuator 30 is operated. The compressed air results in jets of air being directed at the radial and axial surfaces of the filter screen 14 by the nozzles formed by the holes in the tubes 24 and 32.

At the same time, the actuator is operated to cause its output shaft to reciprocate at least once back and forth. Alternatively the output shaft nay be reciprocated continuously during a full cleaning cycle. As the tube 32 is carried by the output shaft, it will reciprocate from left to right in FIG. 2 while remaining parallel to the cylindrical side wall of the filter screen 14. As a result, the air jet from each nozzle will trace a helical path over the surface of the side wall to ensure that every point on the surface of the screen, within a ring, will at some time be exposed to the jet of air from the nozzle. The axial length of the ring is determined by the stroke of the linear actuator and this is selected to be at least as long as the distance between adjacent holes on the tube 32 so that the rings overlap and encompass the full, perforated area of the side wall.

By virtue of the mechanical linkage created by the bell crank lever 34, the left to right axial motion of the output shaft of the actuator 30 will result in a radial up and down motion of the tube 24. This will result in the jet from each nozzle tracing a spiral on the axial end surface of the filter screen so at to cover an annular band having a radial dimension dictated by the stroke of the linear actuator 30. Once again, the spacing of the holes in the tube is selected to ensure that these annular bands overlap and cover the entire perforated area of the axial end face of the filter screen.

A cleaning cycle can be initiated by operator command or when a sensor detects blockage of the filter screen. Alternatively, the cleaning cycle can be performed at regular intervals. The same approach can be used as has previously been for activation of an internal rotary brush. Such activation may be for a period of 7 seconds each time the grain tank is being unloaded but with a minimal period of 10 minutes in between cycles. Having a full grain tank is in this respect a useful measure of the amount of harvesting work done and of dust generated.

The unblocking apparatus of the invention may supplement as well as replace the use or rotary brushes. One could for example use air jets for the axial end surface of the filter screen and rotary brushes for the cylindrical side wall, where the brushes are less prone to wear.

The invention claimed is:

1. A method of unblocking a perforated rotary filter screen having a cylindrical surface and a flat surface having a circular outer perimeter comprising directing a plurality of jets of high pressure air at both surfaces of the filter screen simultaneously as the filter screen is rotated and moving the plurality of jets of air in a direction transverse to the direction of movement of the perforations in the screen.

2. A method as claimed in claim 1, wherein the jets are directed onto the upstream side of the filter screen.

3. A method as claimed in claim 1, wherein the unblocking method is performed in response to operator command.

4. A method as claimed in claim 3, wherein the unblocking method is performed concurrently with an unloading command.

5. A method as claimed in claim 1, wherein the unblocking method is performed in response to a signal from a sensor indicative of blockage of the filter screen.

6. A method as claimed in claim 1, wherein the unblocking method is performed at prescheduled intervals.

7. An apparatus for unblocking a perforated rotary filter screen of an agricultural machine, the rotary filter screen having both a cylindrical surface and a flat surface having a circular outer perimeter, the apparatus comprising a tube connectable to a source of air under pressure and having a plurality of air nozzles for directing jets of high pressure air simultaneously towards both surfaces of the filter screen as the filter screen is rotated and means for reciprocating the tube in a direction transverse to the direction of movement of the perforations on both surfaces.

8. An apparatus as claimed in claim 7, wherein the tube is mounted on the upstream side of a housing supporting the filter screen with each of the plurality of air jets facing towards the upstream side of the filter screen.

9. An apparatus as claimed in claim 7, for use with a filter screen shaped as a drum having both a perforated axial end face and a perforated cylindrical side wall, the apparatus comprising two separate tubes, a first reciprocable axially to unblock the cylindrical side wall of the drum and a second reciprocable radially to unblock the axial end face of the drum.

10. An apparatus as claimed in claim 9, wherein a single linear actuator is provided to cause both tubes to reciprocate, the actuator being rigidly connected to the first tube and being connected by a crank to the second tube.

11. An apparatus as claimed in claim 10, wherein the crank comprises an L-shaped bell crank lever of which one of the limbs is connected to the linear actuator and the other limb is connected to the second tube.

12. The method of claim 1, wherein the step of directing a plurality of jets of high pressure air at both surfaces of the filter screen causes at least one of the plurality of air jets to trace a spiral or helical path over at least one surface of the screen, which includes at least the flat surface having a circular outer perimeter.

13. The apparatus of claim 7, wherein at least one of the plurality of jets of high pressure air traces a spiral or helical path over at least one surface of the screen, which includes at least the flat surface having a circular outer perimeter.

14. An apparatus for unblocking a perforated rotary filter screen of an agricultural machine, the rotary filter screen having both a cylindrical surface and a flat surface having a circular outer perimeter, the apparatus comprising a tube connectable to a source of air under pressure and having a plurality of air nozzles for directing jets of high pressure air simultaneously towards both surfaces of the filter screen as the filter screen is rotated and an actuator for reciprocating the tube in a direction transverse to the direction of movement of the perforations on both surfaces.

15. An apparatus as claimed in claim 14, wherein the tube is mounted on the upstream side of a housing supporting the filter screen with each of the plurality of air jets facing towards the upstream side of the filter screen.

16. An apparatus as claimed in claim 14, for use with a filter screen shaped as a drum having both a perforated axial end face and a perforated cylindrical side wall, the apparatus comprising two separate tubes, a first reciprocable axially to unblock the cylindrical side wall of the drum and a second reciprocable radially to unblock the axial end face of the drum.

17. An apparatus as claimed in claim 16, wherein the actuator is a single linear actuator provided to cause both tubes to reciprocate, the actuator being rigidly connected to the first tube and being connected by a crank to the second tube.

18. An apparatus as claimed in claim 17, wherein the crank comprises an L-shaped bell crank lever of which one of the limbs is connected to the linear actuator and the other limb is connected to the second tube.

19. The apparatus of claim 14, wherein at least one of the plurality of jets of high pressure air traces a spiral or helical path over at least one surface of the screen, which includes at least the flat surface having a circular outer perimeter.

* * * * *